(12) United States Patent
Williams et al.

(10) Patent No.: US 11,427,392 B2
(45) Date of Patent: Aug. 30, 2022

(54) PACKAGING FOR FOOD AND BEVERAGE

(71) Applicant: HEAT SEAL LLC, Cuyahoga Heights, OH (US)

(72) Inventors: Thomas D. Williams, Hudson, OH (US); Nick Sampson, Westlake, OH (US); Melvin S. Freedman, Chicago, IL (US)

(73) Assignee: HEAT SEAL LLC, Cuyahoga Heights, OH (US)

( * ) Notice: Subject to any disclaimer, the term of this patent is extended or adjusted under 35 U.S.C. 154(b) by 0 days.

(21) Appl. No.: 17/252,836

(22) PCT Filed: Jul. 9, 2019

(86) PCT No.: PCT/US2019/040938
§ 371 (c)(1),
(2) Date: Dec. 16, 2020

(87) PCT Pub. No.: WO2020/014183
PCT Pub. Date: Jan. 16, 2020

(65) Prior Publication Data
US 2021/0122554 A1    Apr. 29, 2021

Related U.S. Application Data

(60) Provisional application No. 62/695,323, filed on Jul. 9, 2018.

(51) Int. Cl.
*B65D 77/20* (2006.01)
*A47J 47/14* (2006.01)
(Continued)

(52) U.S. Cl.
CPC .......... *B65D 77/2024* (2013.01); *A47J 47/14* (2013.01); *B65D 1/36* (2013.01); *B65D 21/0233* (2013.01)

(58) Field of Classification Search
CPC .. B65D 77/2024; B65D 1/36; B65D 21/0233; A47J 47/14
(Continued)

(56) References Cited

U.S. PATENT DOCUMENTS 3,189,208 A * 6/1965 Jowett .................... B65D 41/54
215/246
3,692,230 A * 9/1972 Kapiloff ................. B65D 43/20
229/125.06

(Continued)

*Primary Examiner* — Jacob K Ackun
(74) *Attorney, Agent, or Firm* — John A. Yirga, Esq.; Tarolli, Sundheim, Covell & Tummino LLP (57) ABSTRACT

Food packaging and beverage packaging for use in home delivery. The food packaging includes a tray having first walls that define an outer profile of the tray and second walls that are arranged to form partitions. A height of the second walls is different than a height of the first walls. The packaging includes a sealing member and a beverage container having an open end and a sidewall. The sealing member includes a first panel and a second panel and also has a first end, a second end, and first and second sides that extend between the first end and the second end. The first and the second panels are connected one another along the first side, the second side, and the second end of the sealing member. The sealing member is attached to the container by a machine having a rotatable platform and an element for heating the member.

20 Claims, 7 Drawing Sheets

(51) Int. Cl.
*B65D 1/36* (2006.01)
*B65D 21/02* (2006.01)

(58) Field of Classification Search
USPC .......................................................... 215/246
See application file for complete search history.

(56) References Cited

U.S. PATENT DOCUMENTS

| | | | | |
|---|---|---|---|---|
| 3,968,823 | A * | 7/1976 | Simon | B65D 1/0246 220/359.4 |
| 4,018,904 | A * | 4/1977 | Muraoka | B65D 11/16 426/115 |
| 4,133,924 | A * | 1/1979 | Seino | B29C 61/02 428/164 |
| 4,294,367 | A * | 10/1981 | Otsuka | B65D 41/54 215/246 |
| 4,423,819 | A * | 1/1984 | Cummings | A61J 1/1475 215/232 |
| 4,557,505 | A * | 12/1985 | Schaefer | B44F 1/00 283/81 |
| 4,591,683 | A | 5/1986 | Eke | |
| 4,782,976 | A * | 11/1988 | Kenyon, 2nd. | B65D 21/0222 206/508 |
| 4,803,088 | A | 2/1989 | Yamamoto et al. | |
| 5,419,451 | A | 5/1995 | Bitel, Jr. | |
| 5,544,770 | A * | 8/1996 | Travisano | B65D 55/026 206/807 |
| 5,641,084 | A * | 6/1997 | Rice | B65D 55/026 156/69 |
| 5,993,942 | A * | 11/1999 | Bakker | B29C 66/1122 428/192 |
| 8,998,030 | B2 * | 4/2015 | Minnette | B65D 43/0212 220/780 |
| 2002/0053528 | A1 | 5/2002 | Johnson et al. | |
| 2003/0185943 | A1 | 10/2003 | Bradley et al. | |
| 2003/0213718 | A1 | 11/2003 | Ducharme et al. | |
| 2005/0258131 | A1 * | 11/2005 | Moser | B65D 55/0854 215/246 |
| 2006/0165851 | A1 | 7/2006 | Brizio | |
| 2007/0116806 | A1 | 5/2007 | Parsons | |
| 2008/0116098 | A1 | 5/2008 | Marooflan et al. | |
| 2008/0210686 | A1 | 9/2008 | Shapiro et al. | |
| 2008/0245759 | A1 * | 10/2008 | Churchill | B65D 41/62 215/329 |
| 2013/0341387 | A1 | 12/2013 | Fike | |
| 2020/0140161 | A1 * | 5/2020 | Poehls | B65D 51/246 |
| 2020/0255201 | A1 * | 8/2020 | Blysniuk | B65D 75/66 |

* cited by examiner

PACKAGING FOR FOOD AND BEVERAGE

CROSS REFERENCES TO RELATED APPLICATIONS

This application filed under 35 U.S.C § 371 is a national phase application of International Application Serial Number PCT/US2019/040938 filed Jul. 9, 2019, which claims priority to U.S. Provisional Application 62/695,323, filed Jul. 9, 2018.

RELATED APPLICATIONS

This application claims priority to U.S. Provisional Application No. 62/695,323, filed 9 Jul. 2018, the entirety of which is incorporated herein by reference.

FIELD OF THE INVENTION

The present invention relates to the food and beverage industry and, in particular, to systems for packaging food and/or beverage for delivery.

BACKGROUND TO THE INVENTION

The volume of restaurant carry-out meals is rapidly growing. Third party services for delivery of carry-out meals are growing at an even faster rate. Although carry-out and delivery meals improve customer convenience, restaurants may face challenges when trying to find food and beverage packaging that is both appealing to the customer and tamper evident.

Several different solutions for food packaging are known, but each has drawbacks. One known solution utilizes a wax coated folding box having a wire handle. Upon delivery, the food is transferred out of the folding box and onto a plate for heating in a microwave oven. However, food transported in the wax coated box can become mixed and thus unappealing. Additionally, the boxes can easily be tampered with by folding open the box to gain access to the food. This potentially allows for tampering without evidence. Furthermore, any additional plates used during the above described heating generates an additional clean-up item for the customer, creating inconvenience.

Another known solution utilizes a polystyrene clamshell container. However, use of the clamshell creates a risk of spillage during transport due to the fact that no seal is provided by this container. Furthermore, it can be undesirable to use the clamshell container for transporting multiple different food items in the same container, as mixing of the different food items can occur. Furthermore, the clamshell container is easily tampered with without leaving any evidence of the tampering.

Yet another known solution utilizes a molded plastic container with an interlocking plastic lid. Some styles of these types of containers have compartments to contain and separate different food items within the same base container. A molded plastic container with interlocking plastic lid is reasonably good at preventing the mixing of different food items and preventing spillage during transport. However, this solution does not address the tamper evidence issue, as the lid can easily be removed and reclosed with no evidence of tampering.

Similar issues exist with beverage packaging. For example, it is known to provide a locking plastic lid onto a beverage container. However, the plastic lid can easily be removed to gain access to the beverage, thus leaving open the possibility for tampering without evidence. Furthermore, during transport, spillage can occur because the plastic lid does not completely seal the beverage container.

SUMMARY OF THE INVENTION

According to one aspect of the invention, a tray for food packaging includes first walls that define an outer profile of the tray and second walls that are arranged to form partitions within the outer profile of the tray. A height of the second walls is different than a height of the first walls.

According to this aspect of the invention the tray is configured to promote stretching of a shrink film material used with the tray so as to create a seal between the partitions. A plurality of trays stacked upon one another can have a nesting position and a stacking position. In the nesting position second walls of adjacent trays are aligned and/or partitions of adjacent trays are received in one another. In the stacking position second walls of adjacent trays are misaligned and/or partitions of adjacent trays are spaced from one another.

According to another aspect of the invention, a beverage container assembly includes a beverage container and a sealing member. The beverage container has an open end and a sidewall. The sealing member includes a first panel and a second panel. The sealing member further includes a first end, a second end, and first and second sidewalls that extend between the first end and the second end. The first panel and the second panel are connected to one another along the first side, the second side, and the second end of the sealing member. The first panel and the second panel are free from connections to one another along the first end of the sealing member.

According to this other aspect of the invention, the sealing member is caused to sealingly engage the beverage container by a machine having a body that defines a platform for supporting the container and a heating element located within the body for applying heat to the sealing member in order to cause its shrinkage. In the preferred embodiment, the machine includes a motor driven rotating platform for effecting rotation of the container as the sealing member is heated.

Additional features of the invention will become apparent and a fuller understanding obtained by reading the following detailed description in connection with the accompanying drawings.

BRIEF DESCRIPTION OF THE DRAWINGS

Embodiments of the invention will now be described by way of example only, with reference to the accompanying drawings, in which.

DETAILED DESCRIPTION

Figure 1:
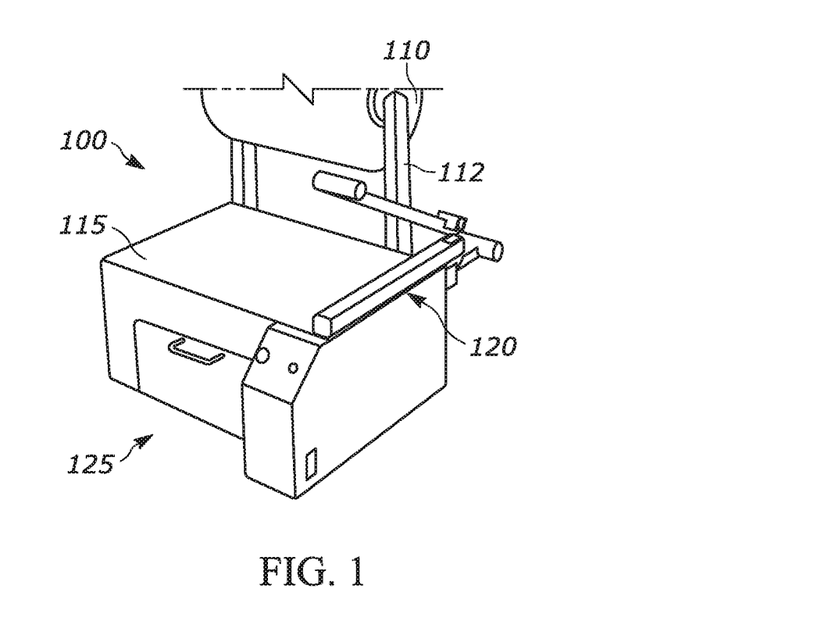
FIG. 1 is a perspective view of a machine according to an aspect of the present invention.

A machine 100 for packaging food for delivery is shown in FIG. 1. The machine 100 includes a first surface 115. A shrink material holder 112 can be secured to the first surface 115. The shrink material holder 112 is configured to dispense shrink film material 110. In one example, the shrink film material 110 is in in the form of a bag manufactured out of Clysar ABLF film material having a thickness of 0.00075". However, the shrink film material 110 can be provided as sleeved on a roll, center folded film, or any other desired arrangement, be manufactured out of any desired material, and have any desired thickness.

A sealing mechanism 120 can also be secured to the first surface 115. The sealing mechanism 120 can be configured to seal and trim shrink film material to a desired size. In one example, the sealing mechanism 120 is a hot wire. However, the sealing mechanism 120 can be a heater circuit etched on thin gage metal or any other desired arrangement.

A heating mechanism 125 can be positioned under the sealing mechanism 120. The heating mechanism 125 can be configured to heat the shrink film material 110 to cause shrinking of the shrink film material 110. In one example, the heating mechanism 125 is an infrared oven that emits infrared waves that are tuned to a wavelength of the shrink film material 110. Accordingly, only the shrink film material 110 is heated (i.e., the food is not heated). However, the heating mechanism 125 can be any other desired arrangement.

The machine 100 can be configured for instantaneous use upon power-up. Specifically, the machine 100 can be configured to achieve shrink film material 110 heating temperatures from ambient temperature in under one minute. Preferably, the machine 100 is configured to achieve shrink film material 110 heating temperatures within a few seconds.

A tray 300 that can be used with the above described machine 100 is shown in FIGS. 2-5. It is contemplated that the tray 300 can be used with arrangements other than the above described machine 100. The tray 300 can be manufactured out of cardboard materials made from wood, cornstarch, sugar cane, palm leaf, or any other desired material(s).

The tray 300 includes first walls 307 that define an outer profile 310 of the tray 300. The tray 300 further includes second walls 302 that are arranged to form partitions 305 within the outer profile 310 of the tray 300. The second walls 302 have a height $H_1$ that is greater than a height $H_2$ of the first walls 307. The height $H_1$ of the second walls 302 being greater than the height $H_2$ of the first walls 307 configures the tray 300 to promote stretching of the shrink film material 110 over the partitions 305 so as to create a seal between the partitions 305. In one example, the height $H_1$ of the second walls 302 is 0.060 inches greater than the height $H_2$ of the first walls 307.

Figure 6:
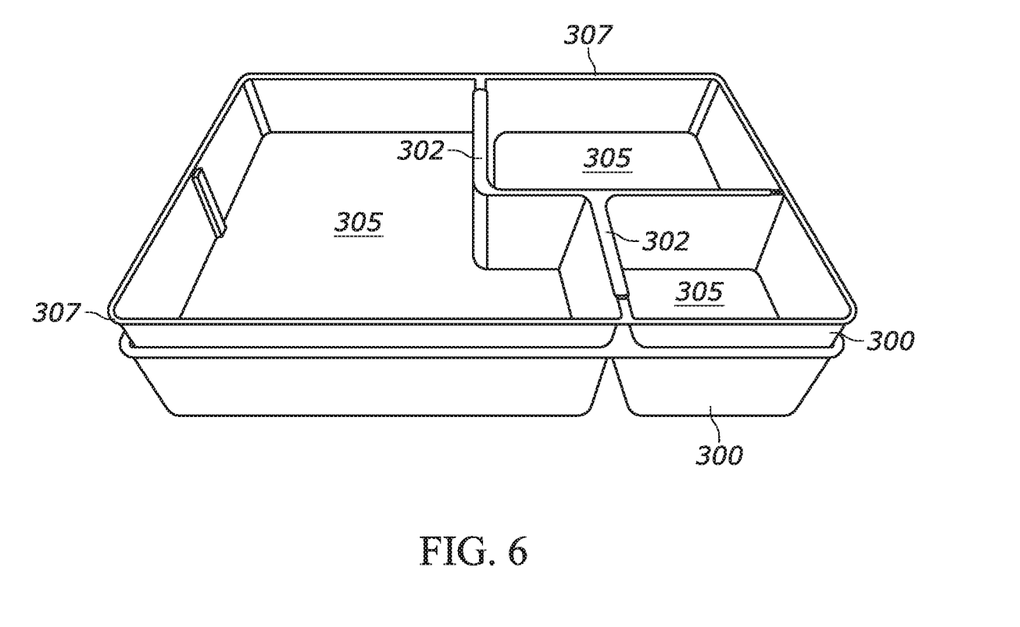
FIG. 6 is an image of two trays that can be used with the machine of FIG. 1, the trays being in a nesting position.
Figure 7:
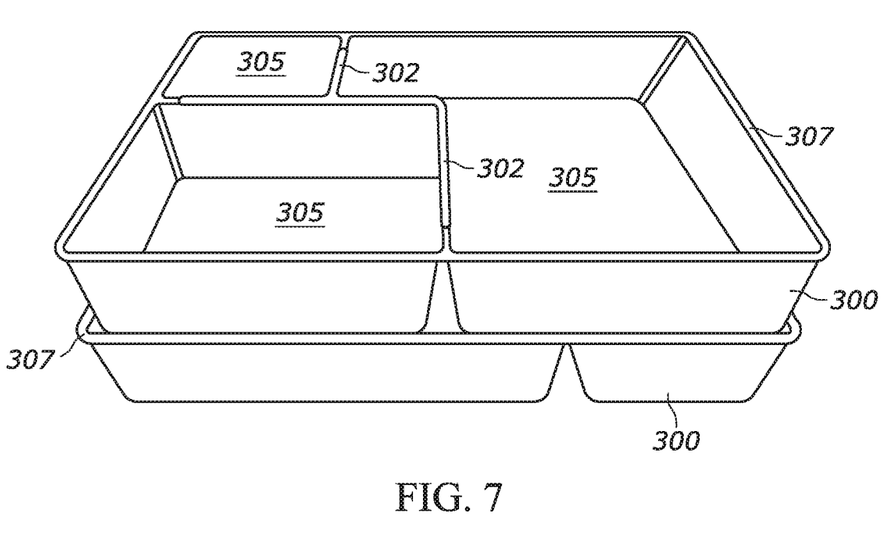
FIG. 7 is an image of the trays of FIG. 6, the trays being in a stacking position.

The tray 305 can be provided with a piercing point 320. The piercing point 320 is configured to promote removal of shrink film material 110 that has been shrunk onto the tray 300. To use the piercing point 320 to promote removal of the shrink film material 110, a customer places a first finger over shrink film material at the location of the piercing point 320 and then pokes through the shrink film material 110 using a second finger at a second location that is spaced from the location of the piercing point 320, The trays 300 can have a nesting position (FIG. 6) and a stacking position (FIG. 7). In the nesting position, adjacent trays 300 are positioned such that the second walls 302 that form the partitions 305 are aligned, thereby result in the partitions 305 being received in one another, thus reducing the space occupied by the plurality of trays 300. In the stacking position, adjacent trays 300 are positioned such that the second walls 302 that form the partitions 305 are misaligned, thereby resulting in adjacent partitions resting on the second walls 302 and being spaced from one another thus preventing damage to food that may be located in the partitions 305.

Figure 2:
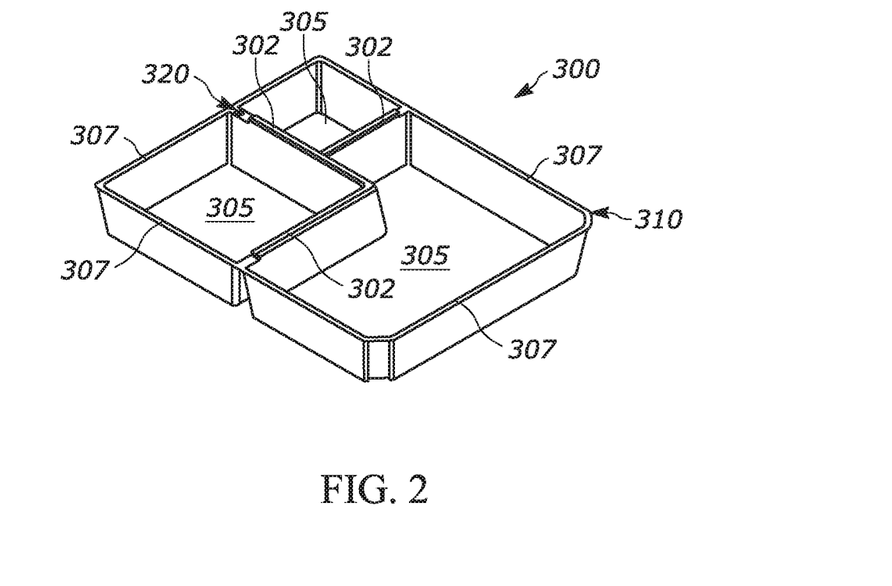
FIG. 2 is a perspective view of a tray that can be used with the machine of FIG. 1.
Figure 3:
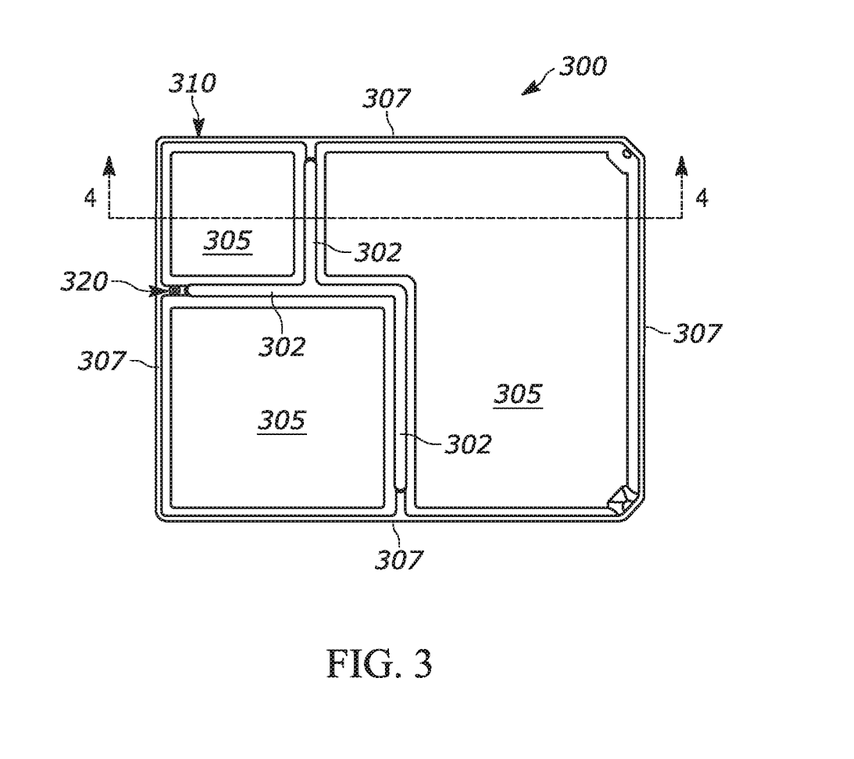
FIG. 3 is a plan view of the tray of FIG. 2.
Figure 4:
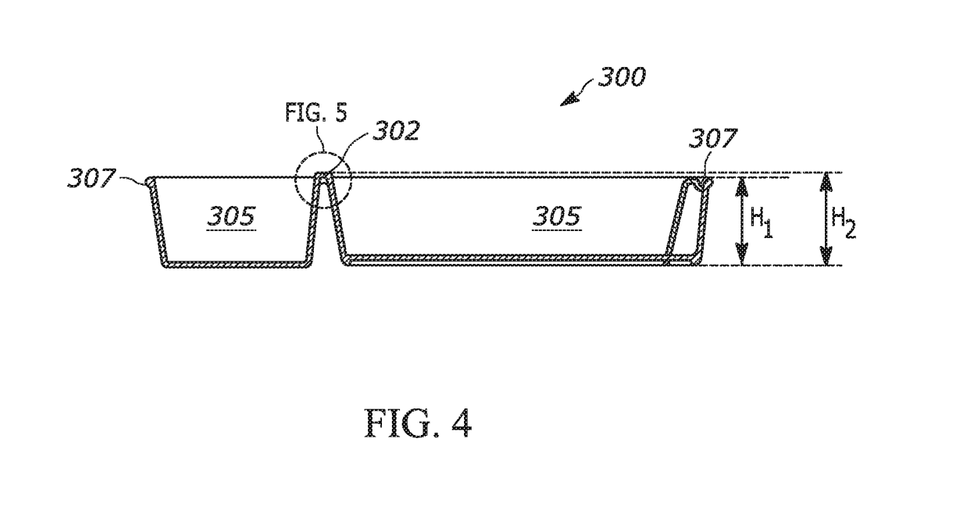
FIG. 4 is a sectional view of the tray of FIG. 2.
Figure 5:
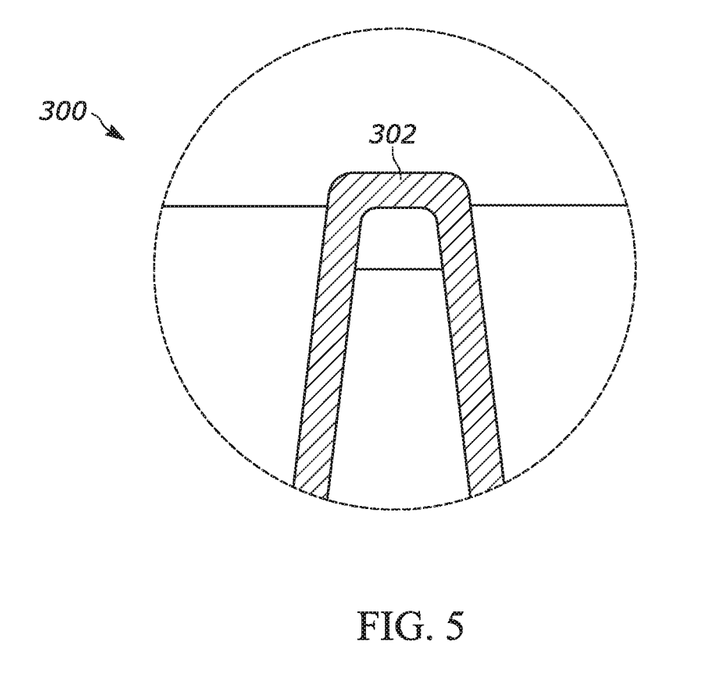
FIG. 5 is a detail view of part of FIG. 4.

An example process of using the tray 300 with the machine 100 will now be described. First, food is plated onto the tray 300 and into the partitions 305. Next, shrink film material 110 is removed from the shrink material holder 112. In this example process the shrink film material 110 is a bag. The tray 300 with the plated food items is placed in the shrink film material 110 bag. Then, the bagged tray 300 is positioned adjacent the sealing mechanism 120 for trimming excess material from the shrink film material 110 bag and sealing. The sealing mechanism 120 is actuated by pivoting the sealing mechanism 120 onto the open end of the shrink film material 110 bag, thus sealing the tray 300 in the bag and simultaneously trimming excess material. It is contemplated that the excess material trimming step can be an operation that is separate from the sealing step.

Pivoting of the sealing mechanism 120 signals the heating arrangement 125 to automatically begin heating. It is contemplated that the heating of the heating arrangement 125 may not be automated and require a separate power-up operation.

The tray 300 and sealed shrink film material 110 bag are placed in the heating arrangement 125 to heat the shrink film material 110 so as to cause the shrink film material 110 to shrink. The shrinking shrink film material 110 conforms to the tray 300 and seals the food in the partitions 305 as the shrink film material 110 shrinks.

Numerous advantages are provided by the above described process of applying the shrink film material 110 bag to the tray 300. First, the process provides food safety by allowing for easy assessment of whether food has been tampered with. The food plated on the tray 300 can only be accessed by tearing the shrink film material 110 bag. Once the shrink film material 110 bag has been compromised, it is easy to discern that the food was potentially tampered with. A second advantage provided by the process is that the food plated on the tray 300 is retained in the partitions 305 that the food was placed in. The arrangement of the tray 300 and the shrink film material 110 bag reduces the chance of food, juices, or sauce from one partition 305 getting intermingled with the same from another partition 305. During shrinking the shrink wrap material 100 conforms tightly to the tray 300, thereby creating a barrier that prevents the undesired intermingling. A third advantage provided by the process is that the shrink wrap material 100 is clear, thus allowing the contents of the tray 300 to be visible. This visibility benefits food presentation and also allows for easier sorting of items once tray 300 is delivered.

Figure 8:
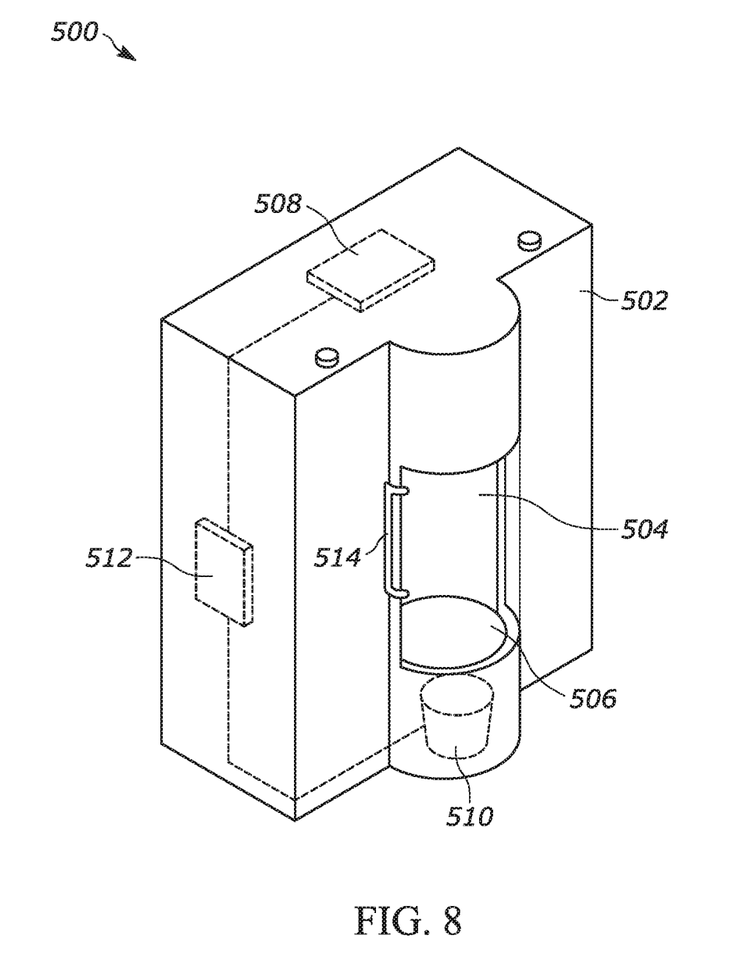
FIG. 8 is a perspective view of a machine according to another aspect of the present invention.

A machine 500 for packaging a beverage is shown in FIG. 8. The machine 500 includes a body 502 that defines a receptacle 504. A platform 506 and a heating element 508 are provided in the receptacle 504. The platform 506 is configured to support a cup. The machine 500 can include a motor 510 for rotating the platform 506. In one example, the motor 510 is an Oriental Motor, synchronous, Model SMK-04-94. However, it is contemplated that any desired motor can be used. Additionally, it is contemplated that the motor can be omitted. The heating element 508 is configured to heat shrink film material to cause the shrink film material to shrink. In one example, the heating element 508 is a Steinel resistance heater, Model 56220E. However, it is contemplated that any desired heating element can be used. Operation of the machine 500, including operation of the motor 510 that rotates the platform 506 and/or the heating element 508, can be controlled by circuitry 512. In one example, the circuitry 512 is Heat Seal custom programmable control board. However, it is contemplated that any desired circuits can be used. A door 514 is provided for selectively closing the receptacle 504. The circuitry 512 can monitor the status of the door 514 to cause the machine 500 to automatically begin a sealing cycle (i.e., energization of the heating element 508 and/or motor 510) when it is sensed that the door 514 is in the closed condition. The circuitry 512 can have a timer that runs the machine 500 in the sealing cycle for a predetermined period of time.

Figure 9:
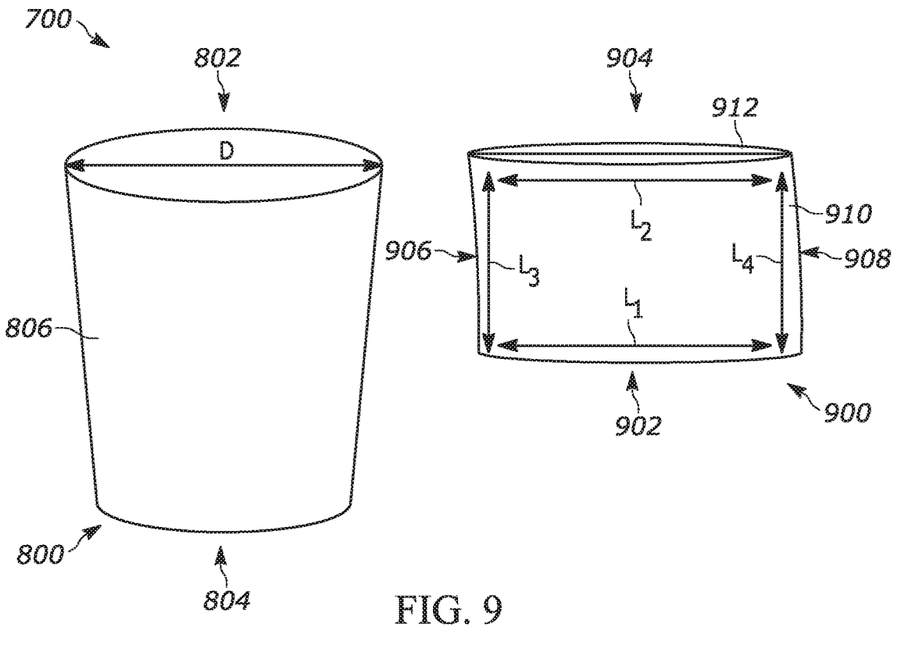
FIG. 9 is an exploded view of a beverage transport assembly that can be used with the machine of FIG. 8.

An exploded beverage container assembly prior to a sealing operation is shown in FIG. 9. The beverage container assembly 700 includes a beverage container 800 and a sealing member 900 and may be used as a transportable beverage packaging.

The beverage container 800 has a first open end 802 and a second closed end 804. A sidewall 806 extends between the first end 802 and the second end 804.

The sealing member 900 is a fully prefabricated component that includes a first panel 910 and a second panel 912. The sealing member 900 includes a first end 902, a second end 904, and first and second sides 906, 908 that extend between the first end 902 and the second end 904. The first panel 910 and the second panel 912 are connected to one another along the first side 906, the second side 908, and the second end 904 of the sealing member 900. The first panel 910 and the second panel 912 are substantially free from connections from one another along the first end 902 of the sealing member 900. In one example, the first panel 910 and the second panel 912 are each manufactured out of Clysar ABLF film material having a thickness of 0.00075".

Figure 10:
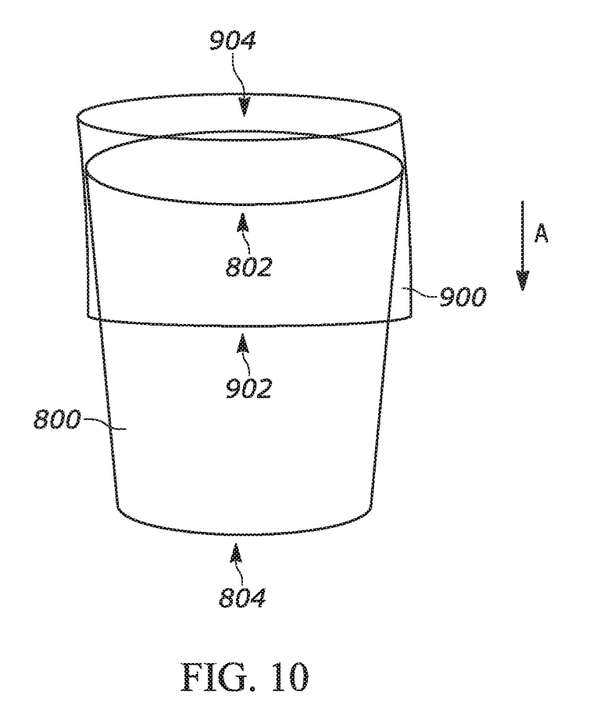
FIG. 10 is an image of the beverage transport assembly of FIG. 9 prior to a sealing operation.

In use, a desired liquid is loaded into the beverage container 800 via the first end 802 and subsequently contained by the second end 804 and sidewall 806. Next, the first open end 902 of the sealing member 900 is placed over the first end 802 of the beverage container 800. Then, the first end 902 of the sealing member 900 is advanced toward the second end 804 of the beverage container 800 in the direction of arrow (A) until the second sealed end 904 of the sealing member 900 contacts the open first end 802 of the beverage container 800. At this point, prior to the sealing operation (shown in FIG. 10), the sealing member 900 fits loosely on the beverage container 800 and can be repositioned or removed.

The beverage container 800, with the positioned sealing member 900, is brought to the machine 500 and placed in the receptacle 504 on the platform 506. The door 514 is then closed. The circuitry 512, in response to sensing that the door 514 has been closed, initiates the sealing cycle by energizing the heating element 508 and the motor 510. The heat emitted by the energized heating element 508 causes the sealing member 900 to shrink. As the sealing member 900 shrinks, the sealing member 900 tightly conforms to the beverage container 800, thus sealing the liquid in the beverage container 800. The energized motor 510 causes the platform to rotate 506, which helps to achieve even heating of the sealing member 900, thus promoting even shrinking and proper sealing. Once the timer of the circuitry 512 times out, the sealing cycle is completed and the heating element 508 and the motor 510 are deenergized. The door 514 can then be opened, and the completed beverage transportation assembly 700 (i.e., after the sealing operation), shown in FIG. 11, can be removed from the receptacle 504. The now tightly conforming sealing member 900 of the beverage transportation assembly 700 seals the beverage container 800 and prevents the liquid from spilling out of the beverage container 800.

The sealing member 900 is dimensioned and configured such that, during the sealing cycle, the sealing member 900 shrinks about the beverage container 800 in a specified manner. Specifically, the sealing member 900 is dimensioned and configured such that, during the sealing cycle, the portions of the first panel 910 and the second panel 912 that surround the sidewall 806 of the beverage container 800 shrink down tightly onto the beverage container 800 first, and then the second end 912 of the sealing member 900 that overlies the first end 802 of the beverage container 800 shrinks down tightly over the opening at the first end 802. The above described specific shrinking process can advantageously prevent deformation of the beverage container 800 and also prevent undesired tearing and other damage of the sealing member 900.

It has been found that that the following formulas can be used to generate specific dimensions for a sealing member 900 for different size beverage containers 800 in order to provide the desired shrinking process. The units of the discussed dimensions are measured in inches. A length $L_1$, $L_2$ of the ends 902, 904 of the sealing member 900 is calculated by multiplying a diameter D of the first end 802 of the beverage container 800 times $\pi$ times 0.55. The length $L_1$, $L_2$ of the ends 902, 904 of the sealing member can be up to 5% longer than the calculated value, but preferably no shorter than the calculated value. A length $L_3$, $L_4$ of the sides 906, 908 of the sealing member 900 is calculated by adding eight to a diameter D of the first end 802 of the beverage container 800 and then dividing that sum by two. The length $L_3$, $L_4$ of the sides 906, 908 can be up to 10% longer than the calculated value, but preferably no shorter than the calculated value.

Figure 11:
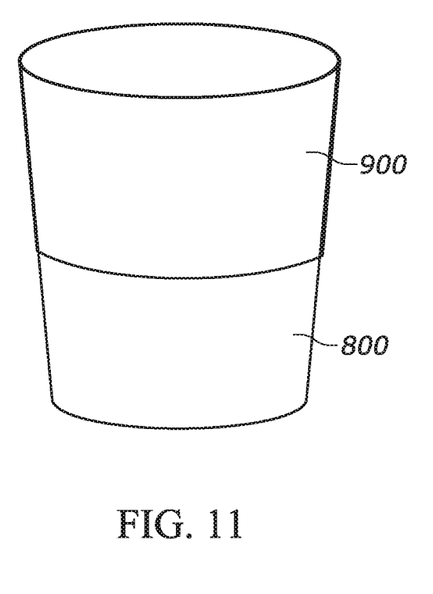
FIG. 11 is an image of the beverage transport assembly of FIG. 9 after a sealing operation.

Beyond preventing spillage, the beverage transportation assembly 700 enhances safety by allowing for easy assessment of whether the beverage has been tampered with. The liquid contained in the beverage container 800 can only be accessed by compromising (e.g., tearing) the sealing member 900. Once the sealing member 900 has been compromised, it is easy to discern that the beverage was potentially tampered with. Furthermore, the sealing member 900 is clear, thus allowing the contents of the beverage container 800 to be visible. This visibility allows for easier sorting of items upon delivery. It is contemplated that the sealing member 900 can replace the known locking plastic lids, or be used in combination with the known locking plastic lids.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A beverage container assembly for transportable beverage packaging comprising:
   a beverage container having an open end and a sidewall; and
   a sealing member including a first panel and a second panel, the sealing member having a first end, a second end, and first and second sides that extend between the first end and the second end, the first panel and the second panel being connected to one another along the first side, the second side, and the second end of the sealing member, the first panel and the second panel being free from connections to one another along the first end of the sealing member; wherein the portions of the first panel and the second panel that surround the sidewall of the beverage container shrink onto the beverage container prior to the portions of the second end of the sealing member that overlie the open end of the beverage container shrinking onto the beverage container.

2. The beverage container assembly according to claim 1, wherein a length of the first end and the second end of the sealing member is calculated by the formula $$L=(D)(\pi)(0.55)$$

wherein L is the length of the first end and the second end of the sealing member and D is a diameter of the open end of the beverage container measured in inches.

3. The beverage container assembly according to claim 1, wherein a length of the first side and the second side of the sealing member is calculated by the formula $$L=(8+D)/2$$

wherein L is the length of the first side and the second side of the sealing member and D is a diameter of the open end of the beverage container measured in inches.

4. The beverage container assembly according to claim 1, wherein the first panel and the second panel are manufactured out of Clysar ABLF film material.

5. The beverage container assembly according to claim 1, wherein the first panel and the second panel have a thickness of 0.00075".

6. The beverage container assembly according to claim 1 wherein said sealing member is sealingly attached to said beverage container by a machine having a body that defines a platform for supporting the container and a heating element located within the body for applying heat to said sealing member in order to cause its shrinkage.

7. The beverage container assembly of claim 6 further including a motor driven rotating platform for effecting rotation of said container as said sealing member is heated.

8. The beverage container assembly according to claim 7 wherein said machine further includes a door for enclosing said container located on said platform and said machine further includes circuitry for monitoring the position of said door in order to cause the energization of the heating element and the motor driven platform when the door is in a closed condition.

9. The beverage container assembly according to claim 6 wherein said machine further includes a timer that energizes said heating element for a predetermined period of time.

10. A beverage container assembly for transportable beverage packaging comprising:
    a beverage container having an open end and a sidewall; and
    a sealing member including a first panel and a second panel, the sealing member having a first end, a second end, and first and second sides that extend between the first end and the second end, the first panel and the second panel being connected to one another along the first side, the second side, and the second end of the sealing member, the first panel and the second panel being free from connections to one another along the first end of the sealing member, the sealing member being dimensioned and configured such that, during shrinking of the sealing member, the portions of the first panel and the second panel that surround the sidewall of the beverage container shrink onto the beverage container prior to the portions of the second end of the sealing member that overlie the open end of the beverage container shrinking onto the beverage container and wherein said sealing member is sealingly attached to said beverage container by a machine having a body that defines a platform for supporting the container and a heating element located within the body for applying heat to said sealing member in order to cause its shrinkage and a motor driven rotating platform for effecting rotation of said container as said sealing member is heated.

11. A beverage container assembly formed by a beverage sealing apparatus having a heating element, the beverage container assembly for transportable beverage packaging, the beverage container assembly comprising:
    a beverage container having an open end, a sidewall, and a closed end opposite the open end spaced by said sidewall; and
    a sealing member including a first substantially annular panel and a second substantially planar panel, the sealing member having a first end, a second end spaced by a sidewall formed by the first substantially annular panel that extends between the first end and the second end, the first substantially annular panel and the second substantially planar panel being connected to one another at the point of contact between sidewall of the first substantially annular pane and said substantially planar panel along the entire second end of the sealing member, the first substantially annular panel and the second substantially planar panel being free from connections to one another along the first end of the sealing member, the sealing member being dimensioned and configured such that, during shrinking of the sealing member, the portions of the first substantially annular panel and the second substantially planar panel that surround the sidewall of the beverage container shrink onto the beverage container prior to the portions of the second end of the sealing member that overlie the open end of the beverage container shrinking onto the beverage container and wherein said sealing member is sealingly attached to said beverage container by said beverage sealing apparatus having a body that defines a platform for supporting the beverage container and said heating element located within the body for applying heat to said sealing member in order to cause its shrinkage and a motor driven rotating platform for effecting rotation of said container as said sealing member is heated by the beverage sealing apparatus to form the beverage container assembly.

12. The beverage container assembly formed by a beverage sealing apparatus according to claim 11, wherein a length of the first end and the second end of the sealing member is calculated by the formula $$L=(D)(\pi)(0.55)$$

wherein L is the length of the first end and the second end of the sealing member and D is a diameter of the open end of the beverage container measured in inches.

13. The beverage container assembly formed by a beverage sealing apparatus according to claim 11, wherein a length of the sidewall of the sealing member is calculated by the formula $$L=(8+D)/2$$

wherein L is the length of the sidewall of the sealing member and D is a diameter of the open end of the beverage container measured in inches.

14. The beverage container assembly formed by a beverage sealing apparatus according to claim 11, wherein the first substantially annular panel and the second substantial planar panel are manufactured out of Clysar ABLF film material.

15. The beverage container assembly formed by a beverage sealing apparatus according to claim 11, wherein the first substantially annular panel and the second substantially planar panel have a thickness of 0.00075".

16. The beverage container assembly formed by a beverage sealing apparatus according to claim 11, wherein said sealing member is sealingly attached to said beverage container by said beverage sealing apparatus further comprising a body that defines a platform for supporting the beverage container and said heating element located within the body for applying heat to said sealing member in order to cause its shrinkage.

17. The beverage container assembly formed by a beverage sealing apparatus according to claim 11, wherein the beverage sealing apparatus further including a motor driven rotating platform for effecting rotation of said beverage container as said sealing member is heated.

18. The beverage container assembly formed by a beverage sealing apparatus according to claim 17 wherein said beverage sealing apparatus further includes a door for enclosing said beverage container located on said platform and said beverage sealing apparatus further includes circuitry for monitoring the position of said door in order to cause the energization of the heating element and the motor driven platform when the door is in a closed condition.

19. The beverage container assembly formed by a beverage sealing apparatus according to claim 11 wherein said machine further includes a timer that energizes said heating element for a predetermined period of time.

20. The beverage container assembly formed by a beverage sealing apparatus according to claim 18 wherein said machine further includes a timer that energizes said heating element for a predetermined period of time.

* * * * *